(12) United States Patent
Reiter (10) Patent No.: US 8,545,096 B2
(45) Date of Patent: Oct. 1, 2013

(54) THERMAL SENSOR DEVICE AND METHOD OF ASSEMBLY

(75) Inventor: Brian Dean Reiter, Kersey, PA (US)

(73) Assignee: GE Infrastructure Sensing, Inc., Billerica, MA (US)

( * ) Notice: Subject to any disclaimer, the term of this patent is extended or adjusted under 35 U.S.C. 154(b) by 515 days.

(21) Appl. No.: 12/537,039

(22) Filed: Aug. 6, 2009

(65) Prior Publication Data

US 2011/0032971 A1   Feb. 10, 2011

(51) Int. Cl.
  G01K 1/00   (2006.01)
  G01K 7/00   (2006.01)

(52) U.S. Cl.
  USPC .......................................... 374/208; 374/163

(58) Field of Classification Search
  USPC ................................... 374/208, 163
  See application file for complete search history.

(56) References Cited

U.S. PATENT DOCUMENTS

| | | | |
|---|---|---|---|
| 2,631,179 A * | 3/1953 | Bell ............................. | 136/242 |
| 3,217,543 A * | 11/1965 | Van Haagen ................... | 374/29 |
| 4,385,197 A * | 5/1983 | Schwagerman ............... | 136/221 |
| 4,499,330 A * | 2/1985 | Pustell .......................... | 136/230 |
| 5,062,571 A * | 11/1991 | Arno et al. ................... | 236/93 A |
| 5,229,065 A * | 7/1993 | Bourgeon et al. ............. | 376/247 |
| 5,230,745 A | 7/1993 | Chretien et al. | |
| 5,342,126 A * | 8/1994 | Heston et al. ................. | 374/208 |
| 5,363,628 A | 11/1994 | Basar et al. | |
| 5,892,806 A | 4/1999 | Scott | |
| 7,237,948 B2 * | 7/2007 | Nakabayashi ................ | 374/148 |
| 2008/0223110 A1 | 9/2008 | Weyl et al. | |

FOREIGN PATENT DOCUMENTS

| | | |
|---|---|---|
| GB | 813781 A | 5/1959 |
| GB | 890490 A | 2/1962 |
| GB | 914833 A | 7/1963 |

OTHER PUBLICATIONS

PCT/US2010/041302, International Search Report and Written Opinion, Nov. 16, 2010.

* cited by examiner

*Primary Examiner* — Mirellys Jagan
(74) *Attorney, Agent, or Firm* — Global Patent Operation; Mark A. Conklin (57) ABSTRACT

A thermal sensor having a robust mechanical connection between a thermal sensor housing and thermal sensor tube is provided having a cross-sectional shape configured to provide a reduced thermal conductivity between the sensor and the housing.

8 Claims, 7 Drawing Sheets

THERMAL SENSOR DEVICE AND METHOD OF ASSEMBLY

BACKGROUND OF THE INVENTION

1. Field of the Invention

The field of the invention relates to sensors generally, and more particularly to certain new and useful advances in thermal sensor assemblies of which the following is a specification, reference being had to the drawings accompanying and forming a part of the same.

2. Description of Related Art

Figure 1:
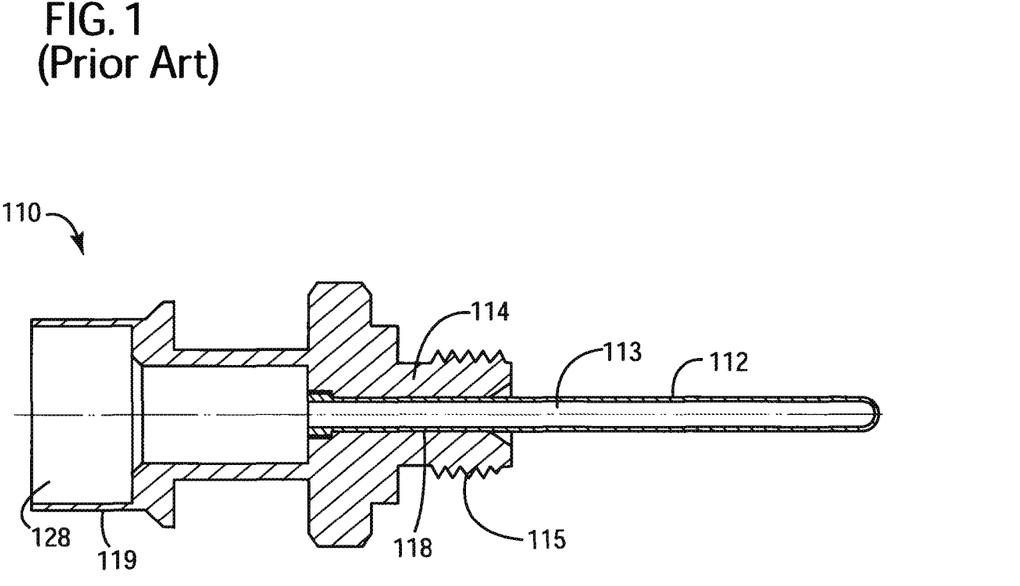
FIG. 1 illustrates a cross section view of conventional thermal sensing assembly

FIG. 1 shows a conventional thermal sensing assembly 110 in cross section. A thermal sensor element (not shown) such as a thermocouple is located within a bore 113 of a sensor tube 112 formed from thin wall deep drawn tubing having a smooth outer surface. Sensor tube 112 provides protection and positioning for the sensor element (not shown). The sensor tube 112 is rigidly connected to sensor housing 114. Sensor tube 112 and sensor housing 114 are conventionally fabricated from steel such as stainless steel or other metal as appropriate for the application environment. To provide a rigid durable connection between sensor tube 112 and sensor housing 114, the sensor tube 112 is commonly welded or machined integral to the sensor housing 114. Other methods of forming the sensing tube 112 to sensor housing 114 connection include press fitting a length of the sensor tube 112 into a smooth bore 118 within the housing 114. A threaded nut (not shown) cooperates with a threaded portion 115 of the housing 114 to retain the housing 114 onto an apparatus (not shown) having an aperture (not shown) when the threaded portion 115 is fitted within the aperture (not shown). A gasket (not shown) such as an O-ring is additionally used to provide a seal between the sensor housing 114 and the apparatus (not shown). An electrical connector 119 portion having an insulating body 128 and electrical terminals (not shown) is commonly provided as part of the sensor housing 114 to enable an electrical connection to the thermal sensor element (not shown).

In the design of a thermal sensing assembly 110 having a sensor tube 112 connected with a housing 114 it is often desirable to have a low total thermal conductivity from the thermal sensor tube 112 to the sensor housing 114. Additionally, it is desirable to have a rigid mechanical connection between the sensor tube 112 and the sensor housing 114 to prevent independent movement between the components and to ensure the assembly's 110 durability.

For at least the reasons stated above, a need exists for an improved thermal sensor device and method for assembling a thermal sensing device, having robust support for a thermal sensor and reduced thermal conductivity between the sensor and the sensor housing.

BRIEF SUMMARY OF THE INVENTION

One or more specific embodiments shown and/or described herein address at least the above-mentioned need. An advantage afforded by an embodiment herein is that a robust mechanical connection between a thermal sensor housing and thermal sensor tube is provided having a reduced thermal conductivity between the sensor and the housing over the prior art.

Apparatus and methods of varying scope are shown and described herein. In addition to the advantages described above, further advantages and/or adaptations or variations will become apparent by reference to the drawings and by reading the remaining portions of the specification.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

The following description makes reference to the accompanying drawings that form a part hereof, and in which is shown by way of illustration specific embodiments that may be practiced. It is understood that other embodiments may be utilized and that various changes can be made to the embodiments shown and described herein without departing from the patentable scope of the claims appended hereto. The following description is, therefore, not to be taken in a limiting sense.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

The detailed description is divided into two sections: the first section describes apparatus embodiments; the second section describes method embodiments.

Apparatus Embodiments

This section describes a particular apparatus of an embodiment with reference to a series of Figures.

Figure 2:
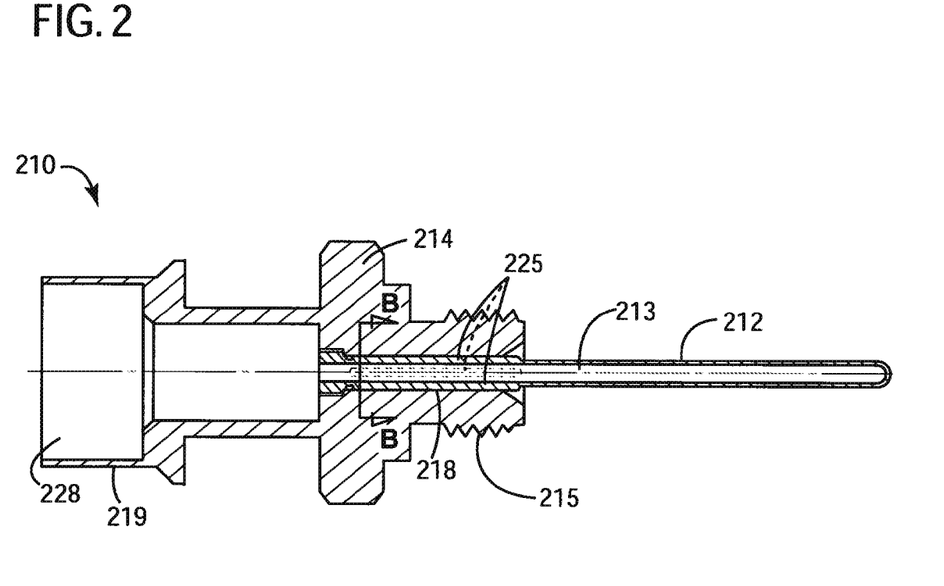
FIG. 2 illustrates perspective view of an embodiment of the thermal sensing assembly of the present invention.
Figures 3, 3A, 3B:
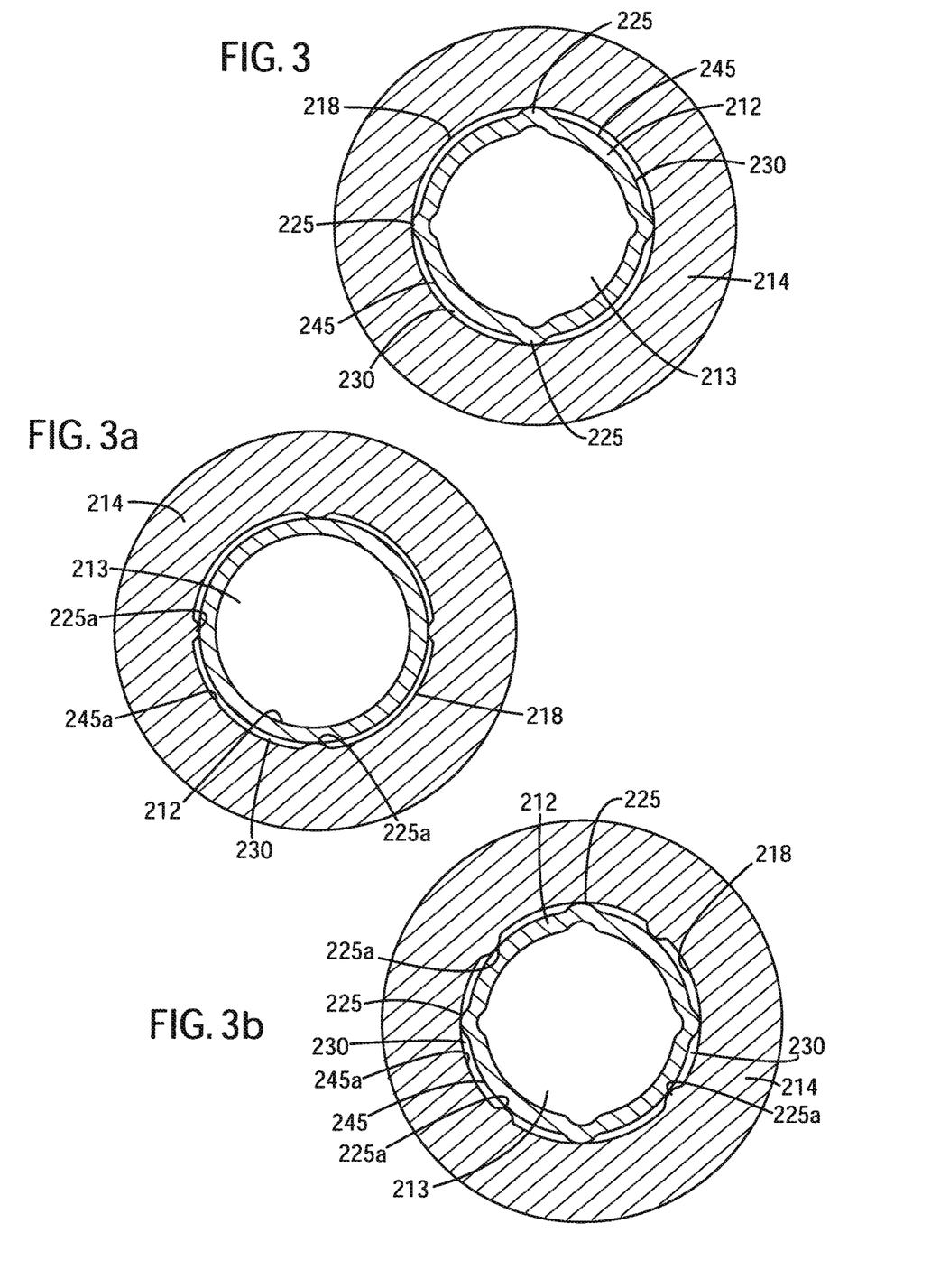
FIG. 3 illustrates an end view of the embodiment of FIG. 2.
FIGS. 3a and 3b illustrate end views of alternative embodiments.

FIG. 2 illustrates an embodiment of thermal sensing assembly 210 in cross section. Thermal sensor element (not shown) such as a thermocouple is located within a bore 213 in a sensor tube 212 formed from thin wall deep drawn tubing. The thermal sensor tube 212 is rigidly connected to thermal sensor housing 214 by fitting within a bore 218 in a housing 214. To provide a rigid and durable connection between sensing tube 212 and sensor housing 214, and to reduce the conduction of thermal energy from the sensing tube 212 to the sensor housing, at least three raised areas such as ribs 225 are added to sensing tube 212. The raised ribs 225 are configured to ensure an interference fit with the bore 218 of housing 214, and to form gaps 230 (FIG. 3) between the housing bore 218 and the outer surface of the sensor tube 212 at the non-ribbed areas 245 (FIG. 3). Such an interference fit provides a rigid mechanical connection between sensing tube 212 and sensor housing 214, while the gaps 230 (FIG. 3) between the sensor tube 212 and housing 214 formed by the ribs 225 reduces the thermal conductivity between tube 212 and housing 214.

FIG. 3 shows a cross-sectional end view of the thermal sensing assembly 210 of FIG. 2 looking in the direction of B-B. Ribs 225 are disposed on the surface of a section of sensor tube 212. In this embodiment, the ribs 225 are located symmetrically about the circumference of at least a section of the sensor tube 212. Thus, for n ribs 225, where n=3, the ribs 225 are disposed at 360/n degrees apart, or at 120 degree spacing about the circumference of at least a section of the sensor tube 212. In other embodiments the ribs 225 may have non-symmetrical spacing. Gaps 230 at the non-ribbed areas 245 of the sensor tube 212 reduce the total surface area contact between the sensor tube 212 and sensor housing 214.

It will be understood that while a specific embodiment has been described as comprising a ribbed sensor tube 212 press fit within a smooth walled bore 218 in a housing 214, the scope of the invention is not so limited and alternate embodiments within the scope of the invention are also contemplated. For example, any number of alternative embodiments may be employed configured with a variety of raised areas, having any number of geometries and shapes, on the sensor tube 212.

Additionally, it will be understood that the bore 218 of sensor housing 214 may alternatively be configured with various raised areas that cooperate with the sensor tube to provide a rigid mechanical connection and reduced thermal conductivity between the sensor tube 212 and sensor housing 214. For example, an end view of such an alternative embodiment is shown in FIG. 3a. The housing bore 218 is configured with a cross-sectional shape having ribs 225a disposed thereon configured to provide a rigid mechanical connection with reduced thermal conductivity by reducing the total surface area contact between the sensor tube 212 and sensor housing 214. The ribs 225a are configured to provide an interference fit with sensor tube 212 and to form gaps 230 between the outer surface of the sensor tube 212 and the non-ribbed areas 245a on the surface of the bore 218.

Moreover, it will be understood that either the sensor tube 212 or the housing bore 218, or both, may be configured with a cross-sectional shape configured to provide a rigid mechanical connection with reduced thermal conductivity by reducing the total surface area contact between the sensor tube 212 and sensor housing 214. For example, an end view of such an alternative embodiment is shown in FIG. 3c. Ribs 225 are disposed on the surface of a section of sensor tube 212, and housing bore 218 is configured with a cross-sectional shape having ribs 225a disposed thereon. Gaps 230 at the non-ribbed areas 245 of the sensor tube 212, and the non-ribbed areas 245a on the surface of the bore 218, reduce the total surface area contact between the sensor tube 212 and sensor housing 214.

Method Embodiments

Figure 4:
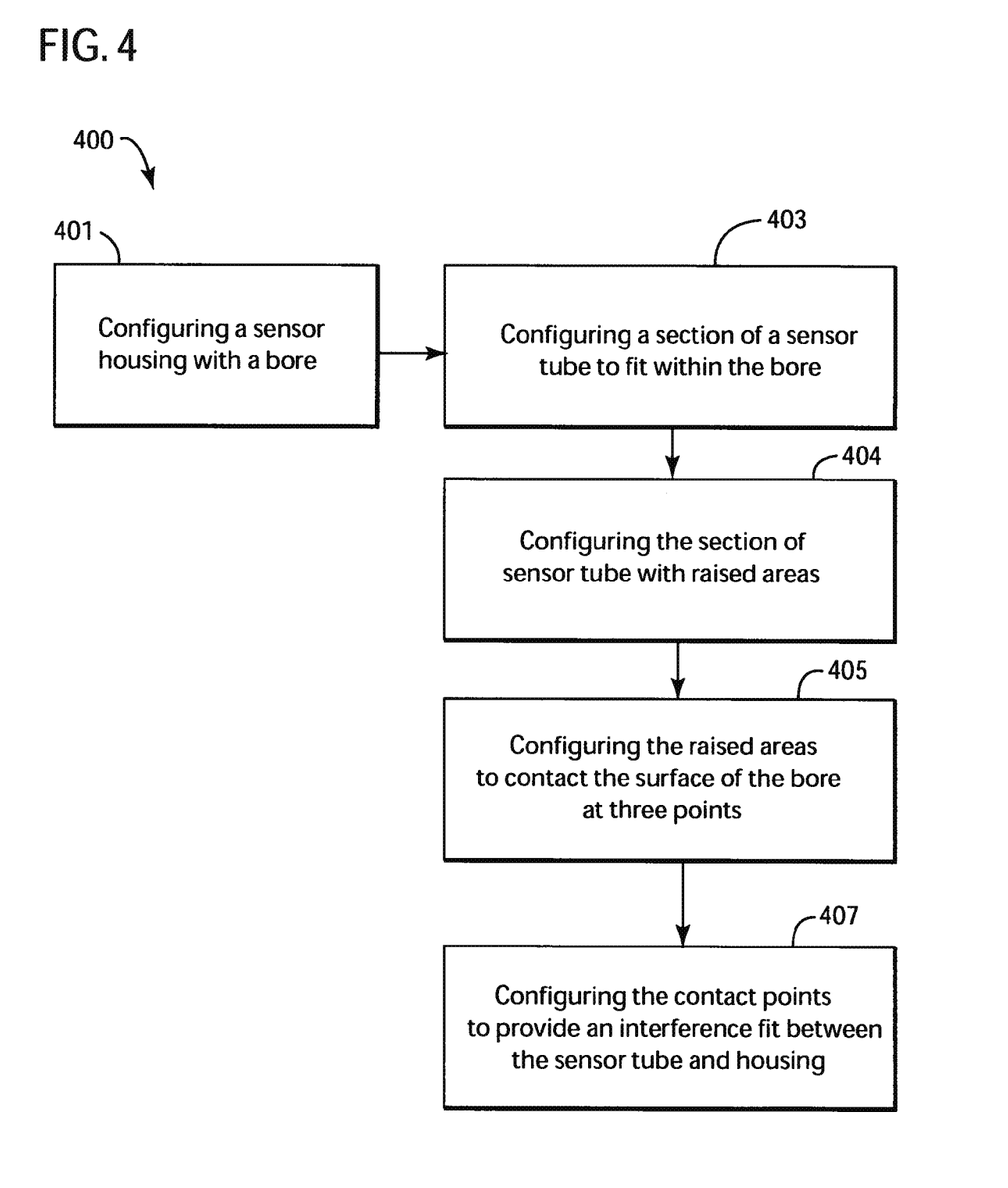
FIGS. 4, 4a, and 4b area flow diagrams illustrating alternative method of assembly of alternative embodiments.

FIG. 4 is a flowchart depicting a method 400 of assembling a sensor assembly 210 including a sensor tube 212 and a sensor housing 214. At step 401, the method comprises configuring the sensor housing 214 with a smooth bore 225. The method includes at step 403 configuring a first section 213 of the sensor tube 212 at to fit within the bore 218, and at step 404, configuring the surface of the first section 213 of the sensor tube 212 with three ribs 225, and at step 405 configuring the three ribs 225 to contact the surface of the bore 218 along a portion of the ribs 225. Step 407, comprises configuring the three ribs 225 to provide interference fit between the sensor housing 214 and the sensor tube 212.

As a result of the process of FIG. 4, the finished sensor assembly 210 will have a rigid mechanical connection between sensing tube 212 and sensor housing 214, and a reduced the thermal conductivity from tube 212 to housing 214.

Figure 4A:
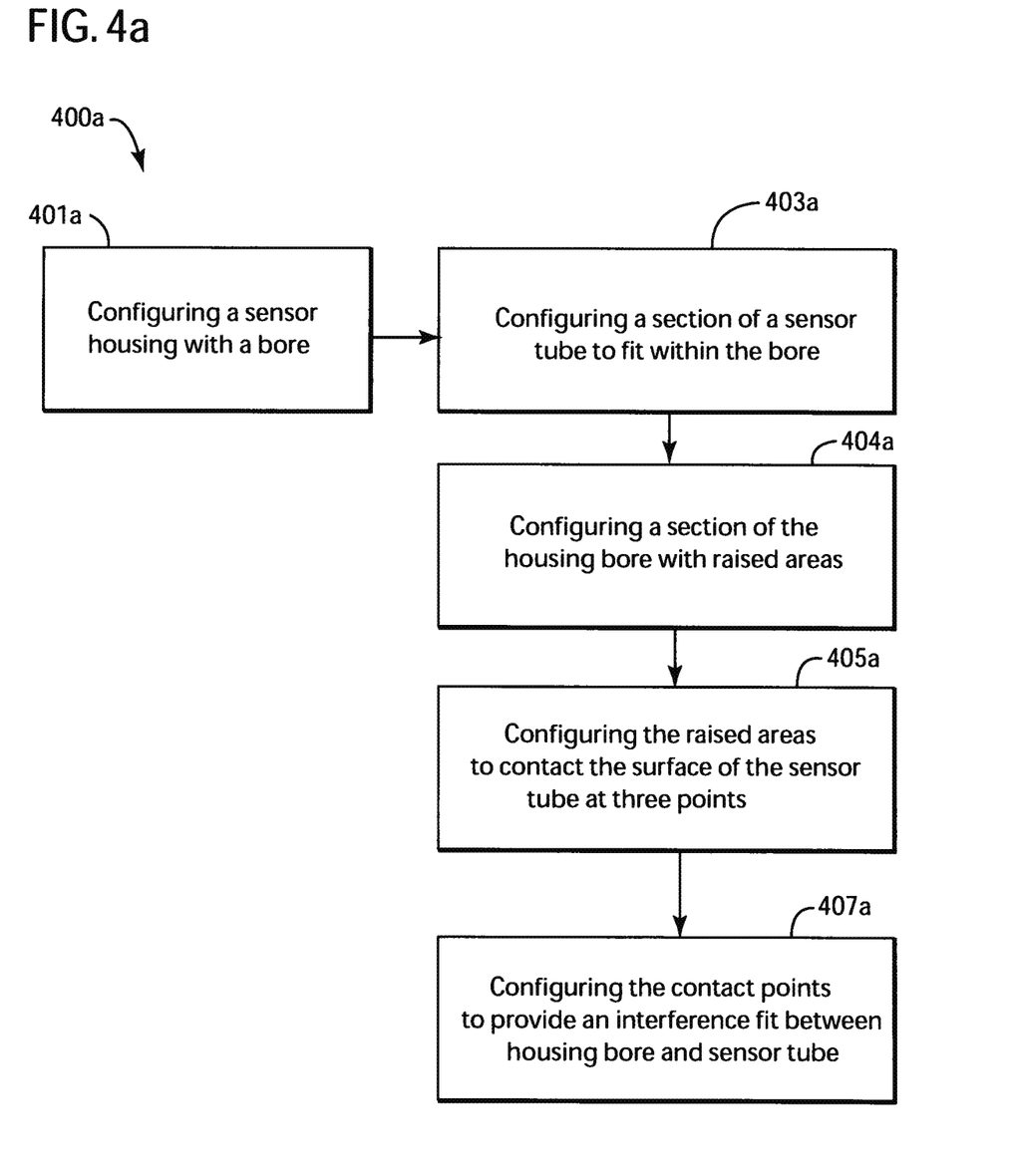

FIG. 4a is a flowchart depicting an alternative method 400a of assembling a sensor assembly 210 including a sensor tube 212 and a sensor housing 214. At step 401a, the method comprises configuring the sensor housing 214 with a bore 218. The method includes at step 403a configuring a first section 213 of the sensor tube 212 at to fit within the bore 218, and at step 404a, configuring a section of the surface of the bore 218 with three ribs 225a, and at step 405a configuring the three ribs 225a to contact the surface of the sensor tube 212 along a portion of the ribs 225. Step 407a, comprises configuring the three ribs 225a to provide interference fit between the sensor housing 214 and the sensor tube 212.

Figure 4B:
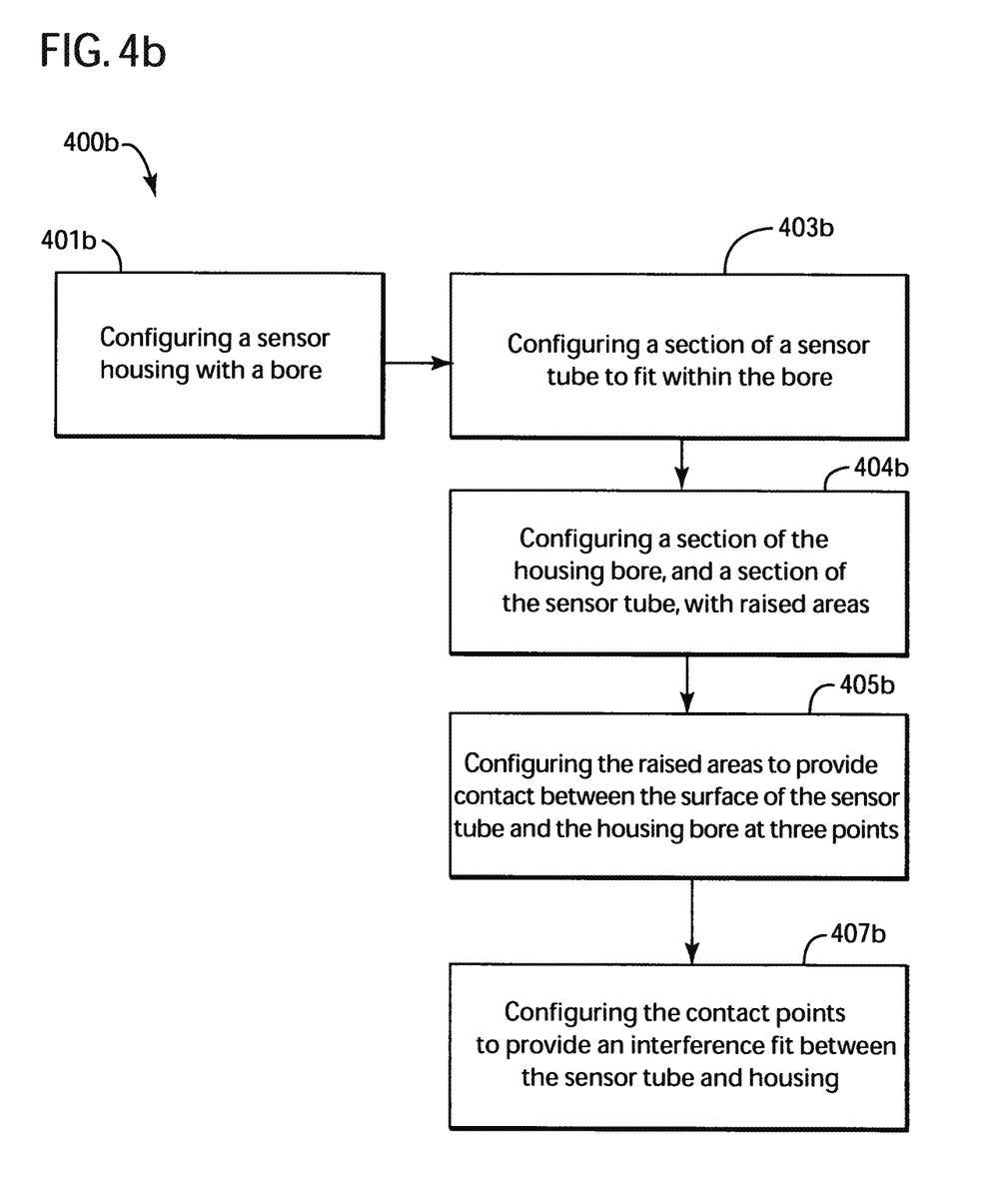

FIG. 4b is a flowchart depicting an alternative method 400b of assembling a sensor assembly 210 including a sensor tube 212 and a sensor housing 214. At step 401b, the method comprises configuring the sensor housing 214 with a bore 218. The method includes at step 403b configuring a first section 213 of the sensor tube 212 to fit within the bore 218, and at step 404b, configuring a section of the surface of the bore 218 with raised areas 225a, and a first section 213 of the sensor tube 212 with raised areas 225. At step 405b the method comprises configuring the raised areas 225, 225a to provide contact between the surface of the sensor tube 212 and the surface of the bore 218. At step 407b, the method comprises configuring the raised areas 225, 225a to provide interference fit between the sensor housing 214 and the sensor tube 212.

Figure 5:
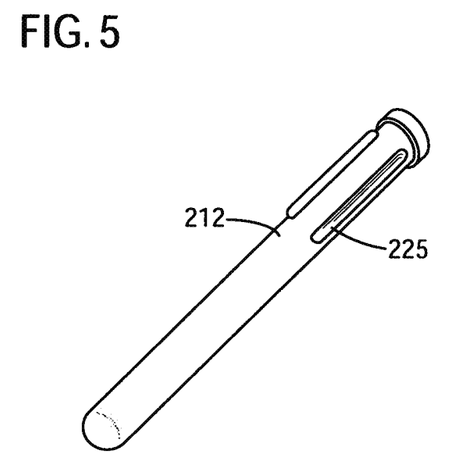
FIG. 5 illustrates a step of the process of FIG. 4

Referring to FIG. 5, the sensor tube 212 of the process of FIG. 4 is illustrated wherein the sensor tube 212 comprising at least a first section provided with at least three ribs 225 configured to contact the surface of the bore 218. The ribs 225 are located symmetrically about the circumference of at least a section of the sensor tube 212. Thus for n ribs 225, where n=3, the ribs 225 are disposed at 360/n degrees apart or at 120 degree spacing about the circumference of at least a section of the sensor tube 212.

Subsequent to the placement of the ribs 225 on the sensor tube 212, the first section of sensor tube 212 is moved or otherwise positioned so as to be inserted the bore 218. In this arrangement, the sensor tube 212 is then pressed into the bore 218 in a press fitting process. In this manner, the raised ribs 225 will form an interference fit with the smooth surface of the bore 218.

It will be understood that while a specific method embodiments have been described as comprising configuring the surface of the first section 213 of the sensor tube 212 with three ribs 225, or configuring a section of the bore 218 of the sensor housing 214 with three ribs 225, or configuring both the sensor tube 212 and a section of the bore 218 of the sensor housing 214 with three ribs 225, the scope of the invention is not so limited and alternate method steps within the scope of the invention are also contemplated. For example, the method may alternatively comprise configuring any number of alternative cross sectional geometries or shapes to provide a variety of raised areas, on the sensor tube 212 housing bore 218, or both. Additionally, it will be understood that the method may alternatively comprise configuring any number of alternative cross sectional geometries or shapes to provide a variety of raised areas on the housing bore 218 configured to cooperate with the sensor tube 212 to provide a rigid mechanical connection with reduced thermal conductivity between the sensor tube 212 and sensor housing 214. Moreover, it will be understood that the method may alternatively comprise configuring either the sensor tube 212 or the housing bore 218, or both, with a cross-sectional geometry or shape configured to provide a rigid mechanical connection and reduced thermal conductivity by reducing the total surface area contact between the sensor tube 212 and sensor housing 214.

This specification, including the claims, abstract and drawings, is intended to cover any adaptations or variations of the specific embodiments illustrated and described herein. Accordingly, the names of elements, components or features, of the above-described system, methods, and apparatus are not intended to be limiting. It is contemplated that the above-described embodiments, whether adapted or varied or not, are applicable to future thermal sensor assembly devices and methods. Moreover, the terminology used herein is intended to encompass all thermal sensor assembly devices and methods that provide the same or equivalent functionality described herein.

Although effort was made to show all of the particular elements, components or features of each of the above-described specific embodiments in separate figures, this may not have been possible. In the event that one or more elements, components or features of one or more of the above-described specific embodiments are shown in some drawings and not in others, it is contemplated that each element, component or feature of one drawing may be combined with any or all of the other elements, components or features shown in any or all of the remainder of the drawings, as described herein, as claimed herein or in any other suitable fashion.

The words "including", "comprising", "having", and "with" as used herein are to be interpreted broadly and comprehensively and are not limited to any physical interconnection. Additionally, patentable scope is defined by the following claims, which are intended to encompass not only the specific embodiments described above, but also adaptations or variations thereof (i) that have structural elements that do not differ from the literal language of the claims, or (ii) that have equivalent structural elements with insubstantial differences from the literal language of the claims.

What is claimed is:

1. A sensor assembly comprising:
a sensor housing having a first bore with a first diameter;
a sensor tube configured to fit within said first bore of said sensor housing, said sensor tube having a first section, a second section and a second bore;
a thermal sensor element disposed in said second bore of said sensor tube,
wherein said first section of said sensor tube comprises a cross-sectional shape with at least three ribs formed integrally with and equally spaced about the circumference of said sensor tube,
wherein the at least three ribs of the sensor tube extend axially along the sensor tube from a first end proximate a first open end of the first bore to a second end proximate a second open end of the first bore,
wherein the sensor tube forms a shoulder at the first end, the shoulder having a second diameter that is larger than the first diameter of the first bore,
wherein the shoulder is disposed in a corresponding feature of the sensor housing at the first open end,
wherein the at least three ribs are configured to reduce thermal conductivity from said sensor tube to said sensor housing, and
wherein said first section of said sensor tube is configured to contact a surface of said first bore at said at least three ribs.

2. The sensor assembly of claim 1, wherein said at least three ribs provide an interference fit between the surface of said first bore and said first section of said sensor tube.

3. A sensor assembly comprising:
a sensor housing having a first bore with a first diameter;
a sensor tube configured to fit within said first bore, said sensor tube having a second bore and at least three ribs;
a thermal sensor element disposed in said second bore of said sensor tube,
wherein said first bore of said sensor housing has a cross-sectional shape with at least three ribs formed integrally with and equally spaced about the circumference of said first bore,
wherein the at least three ribs of the sensor tube extend axially along the sensor tube from a first end proximate a first open end of the first bore to a second end proximate a second open end of the first bore,
wherein the sensor tube forms a shoulder at the first end the shoulder having a second diameter that is larger than the first diameter of the first bore,
wherein the shoulder is disposed in a corresponding feature of the sensor housing at the first open end,
wherein the at least three ribs of said sensor tube and the at least three ribs of said first bore of said sensor housing are configured to reduce thermal conductivity from said sensor tube to said sensor housing, and
wherein said first bore of said sensor housing, is configured to contact the surface of said sensor tube at said at least three ribs.

4. The sensor assembly of claim 3, wherein said at least three ribs of said sensor tube and said at least three ribs of said sensor housing provide an interference fit between the surface of said first bore and said surface of said sensor tube.

5. A method of assembling a sensor assembly, said sensor assembly having a sensor tube, a sensor housing, and a thermal sensor element, said method comprising:
configuring the sensor housing with a first bore with a first diameter;
configuring the sensor tube with a first section to fit within the first bore and a second bore in which the thermal sensor element is disposed;
configuring the first section of the sensor tube to have a cross-sectional shape with at least three ribs formed integrally with and equally spaced about the circumference of said sensor tube, wherein the at least three ribs of the sensor tube extend axially along the sensor tube from a first end proximate a first open end of the first bore to a second end proximate a second open end of the first bore, wherein the sensor tube forms a shoulder at the first end, the shoulder having a second diameter that is larger than the first diameter of the first bore, wherein the shoulder is disposed in a corresponding feature of the sensor housing at the first open end, and wherein the at least three ribs are configured to reduce thermal conductivity from said sensor tube to said sensor housing; and
configuring the surface of the first section of the sensor tube to contact the surface of the bore at said at least three ribs of said first section of said sensor tube.

6. The method of claim 5, further comprising configuring said at least three ribs of said first section of said sensor tube to provide an interference fit between the surface of the first bore of said sensor housing and the first section of the sensor tube.

7. A method of assembling a sensor assembly, said sensor assembly having a sensor tube, a sensor housing, and a thermal sensor element, said method comprising:
   configuring the sensor housing with a first bore with a first diameter;
   configuring the sensor tube with a first section to fit within the bore, a second bore in which the thermal sensor element is disposed, and at least three ribs;
   configuring the first bore of said sensor housing to have a cross-sectional shape with at least three ribs firmed integrally with and equally spaced about the circumference of said first bore, wherein the at least three ribs of the sensor tube extend axially along the sensor tube from a first end proximate a first open end of the first bore to a second end proximate a second open end of the first bore, wherein the sensor tube forms a shoulder at the end, the shoulder having a second diameter that is larger than the first diameter of the first bore, wherein the shoulder is disposed in a corresponding feature of the sensor housing at the first open end, and wherein said at least three ribs of said sensor housing are configured to reduce thermal conductivity from the sensor tube to the sensor housing;
   configuring the first section of said sensor tube to have a cross-sectional shape with at least three ribs equally formed integrally with and spaced about the circumference of said first section, and wherein said at least three ribs of said sensor tube are configured to reduce thermal conductivity from the sensor tube to the sensor housing; and
   configuring the surface of the first bore of said sensor housing and the surface of the first section of said sensor tube to be in contact at said at least three ribs on said first bore and said at least three ribs on said sensor tube.

8. The method of claim 7, further comprising configuring said at least three ribs of said first bore of said sensor housing and said at least three ribs on said first section of said sensor tube to provide an interference fit between the first bore of said sensor housing and the first section of said sensor tube.

* * * * *

UNITED STATES PATENT AND TRADEMARK OFFICE
CERTIFICATE OF CORRECTION

PATENT NO. : 8,545,096 B2  
APPLICATION NO. : 12/537039  
DATED : October 1, 2013  
INVENTOR(S) : Reiter Page 1 of 1

It is certified that error appears in the above-identified patent and that said Letters Patent is hereby corrected as shown below:

In the Claims:

In Column 5, Line 46, in Claim 1, delete "section" and insert -- section, --, therefor.

In Column 6, Line 20, in Claim 3, delete "first end" and insert -- first end, --, therefor.

In Column 6, Line 29, in Claim 3, delete "housing," and insert -- housing --, therefor.

In Column 7, Line 10, in Claim 7, delete "firmed" and insert -- formed --, therefor.

In Column 7, Line 17, in Claim 7, delete "end," and insert -- first end, --, therefor.

Signed and Sealed this
Nineteenth Day of November, 2013

Teresa Stanek Rea
*Deputy Director of the United States Patent and Trademark Office*